US009884476B2

(12) United States Patent
Albert et al.

(10) Patent No.: US 9,884,476 B2
(45) Date of Patent: Feb. 6, 2018

(54) METHOD FOR MANUFACTURE OF AT LEAST ONE COMPONENT OF A FIELD DEVICE

(71) Applicant: Endress + Hauser GmbH + Co. KG, Maulburg (DE)

(72) Inventors: Joachim Albert, Leonberg (DE); Detlev Wittmer, Maulbronn (DE); Marc Baret, Kembs (FR); Thomas Uehlin, Schopfheim (DE); Dietmar Spanke, Steinen (DE); Benjamin Mack, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 96 days.

(21) Appl. No.: 14/863,526

(22) Filed: Sep. 24, 2015

(65) Prior Publication Data
US 2016/0089840 A1   Mar. 31, 2016

(30) Foreign Application Priority Data

Sep. 26, 2014   (DE) .................... 10 2014 114 016

(51) Int. Cl.
*B33Y 80/00* (2015.01)
*B22F 3/105* (2006.01)
(Continued)

(52) U.S. Cl.
CPC ............ *B33Y 80/00* (2014.12); *B22F 3/1055* (2013.01); *B22F 3/1103* (2013.01); *B22F 7/06* (2013.01);
(Continued)

(58) Field of Classification Search
CPC ..... B05D 1/26; B22F 3/1055; B29C 67/0055; B29C 67/0059; B29C 67/0077;
(Continued)

(56) References Cited

U.S. PATENT DOCUMENTS

| 2006/0211802 A1* | 9/2006 | Asgari | A61L 27/04 524/439 |
| 2007/0118243 A1* | 5/2007 | Schroeder | B33Y 50/00 700/118 |
| 2014/0350680 A1* | 11/2014 | Le | A61L 27/50 623/15.12 |

FOREIGN PATENT DOCUMENTS

| DE | 102006025262 A1 | 12/2007 | |
| DE | 102008025869 A1 * | 12/2009 | B22F 3/105 |

(Continued)

OTHER PUBLICATIONS

Machine translation of DE 102008025869 A1 (published on Dec. 3, 2009.*

(Continued)

*Primary Examiner* — Leo B Tentoni
(74) *Attorney, Agent, or Firm* — Bacon & Thomas, PLLC

(57) ABSTRACT

A method for manufacture of at least one component of a field device for determining or monitoring a process variable, wherein the field device is applied in automation technology and is manufactured from at least one material. The method comprises method steps as follows: specifying at least one structure related and/or material related boundary condition of the component and/or a boundary condition relevant for the functionality of the component and/or at least one external boundary condition, which takes into consideration the influence of environmental conditions on the component at the location of use; optimizing the structure of the component via a finite element model taking into consideration the at least one structure related and/or material related boundary condition and/or the at least one boundary condition relevant for the functionality of the component and/or the at least one environmental condition, wherein the optimized structure of the component is described by digital data; transferring the digital data, which (Continued)

describe the optimized structure of the component, to a 3-D printer; and printing the component in accordance with the digital data.

13 Claims, 1 Drawing Sheet

(51) Int. Cl.
| | |
|---|---|
| *B33Y 10/00* | (2015.01) |
| *B33Y 50/00* | (2015.01) |
| *B29C 64/106* | (2017.01) |
| *B29C 64/153* | (2017.01) |
| *B29C 64/112* | (2017.01) |
| *B29C 64/118* | (2017.01) |
| *B29C 67/00* | (2017.01) |
| *B22F 3/11* | (2006.01) |
| *B22F 7/06* | (2006.01) |

(52) U.S. Cl.
CPC .......... *B29C 64/106* (2017.08); *B29C 64/112* (2017.08); *B29C 64/118* (2017.08); *B29C 64/153* (2017.08); *B29C 67/0051* (2013.01); *B33Y 10/00* (2014.12); *B33Y 50/00* (2014.12); *B22F 2003/1057* (2013.01); *Y02P 10/295* (2015.11)

(58) Field of Classification Search
CPC . B29C 67/0081; B29C 64/106; B29C 64/112; B29C 64/118; B29C 64/153
USPC ............ 264/113, 129, 308, 497; 219/121.66, 219/121.85
See application file for complete search history.

(56) References Cited

FOREIGN PATENT DOCUMENTS

| | | |
|---|---|---|
| DE | 102009037893 A1 | 2/2011 |
| DE | 102009060736 A1 | 6/2011 |

OTHER PUBLICATIONS

Wikipedia: 3D-Druck. Version vom Sep. 25, 2014. [Recherchiert am Aug. 3, 2015]. Im Internet: <URL: https://de.wikipedia.org/w/index.php, ?title=3D- Druck&oldid=134346579>.

Wikipedia: Porositat. Version vom Sep. 4, 2014. [Recherchiert am Aug. 5, 2015]. Im Internet: URL: https://de.wikipedia.org/w/index.php, ?title=Porosit, %C3%A4t&oldid=133724598>.

German Search Report, German Patent Office, Munich, DE, dated Aug. 12, 2015.

Hoffmann, M., Holtkemeier, K.-U.: Topologieoptimierung in der Produktentwicklung Einfuhrung—Anwendungsmoglichkeiten—Zukunftsperspektive, Feb. 3, 2007, [Recherchiert am Apr. 8, 2015]. Im Internet: <URL: http://www.konstruktionspraxis.vogel.de/themen/digitale_konstruktion/berechnen/articles/114084/>.

Wikipedia: 3D-Druck. Version vom Sep. 25, 2014. [Recherchiert am Mar. 8, 2015]. Im Internet: <Url: hittps://de.wikipedia.org/w/index.php,?title=3D-Druck&oldid=134346579>.

Wikipedia: Porositat. Version vom Apr. 9, 2014. [Recherchiert am May 8, 2015]. Im Internet: <Url: https://de.wikipedia.org/w/index.php,?title=Porosit,%C3%A4t&oldid=133724598>.

* cited by examiner

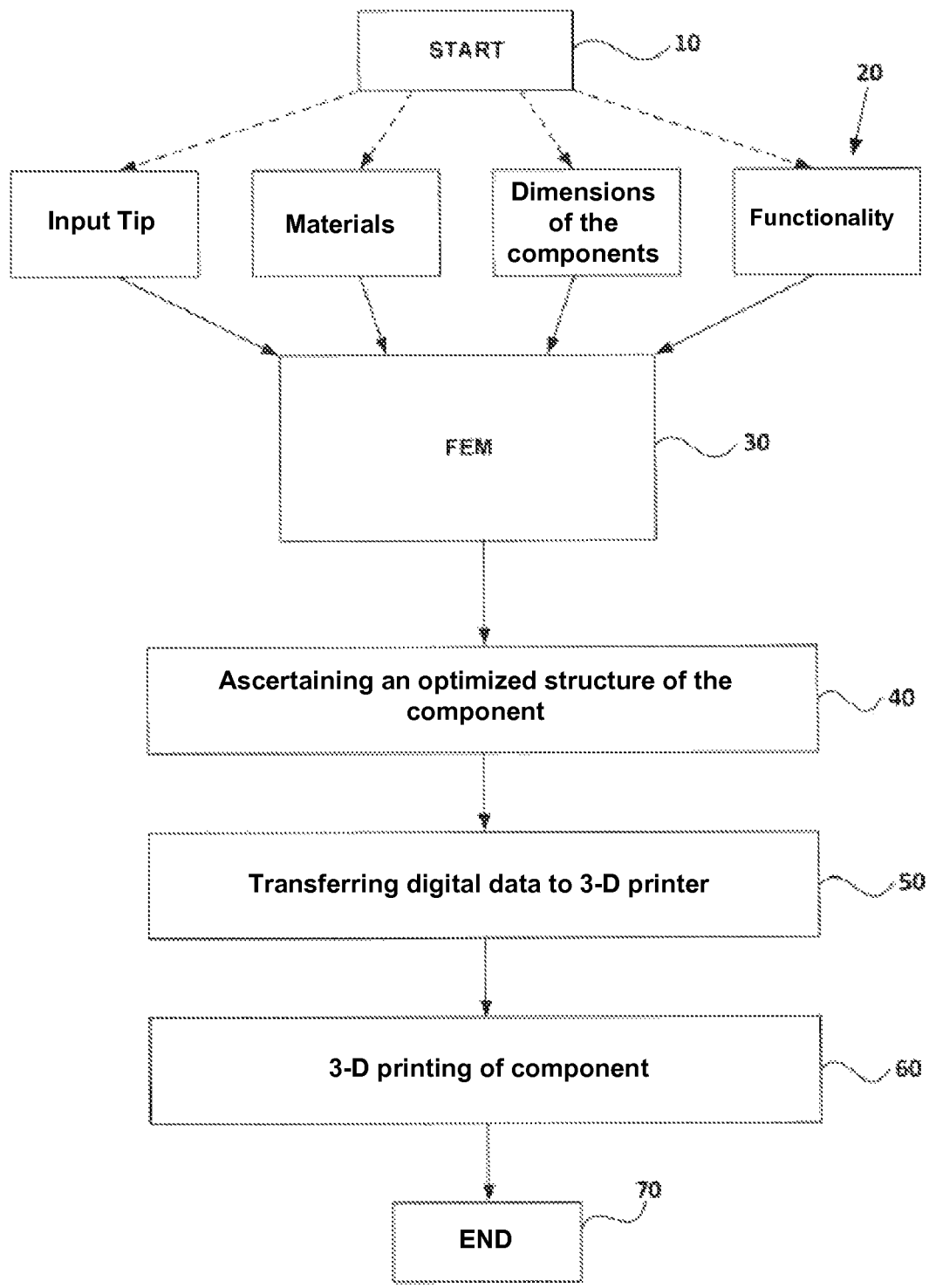

METHOD FOR MANUFACTURE OF AT LEAST ONE COMPONENT OF A FIELD DEVICE

The invention relates to a method for manufacture of at least one component of a field device for determining or monitoring a process variable, wherein the field device is applied in automation technology and is manufactured from at least one material. Furthermore, the invention relates to a component, which is produced according to the method of the invention.

Serving for registering process variables in automation technology are sensors, which are integrated, for example, in fill level measuring devices, flow measuring devices, pressure- and temperature measuring devices, analytical measuring devices, etc. The devices register the corresponding process variables, fill level, flow, pressure, temperature, analysis data, such as pH-value, turbidity or conductivity. Serving for influencing process variables are actuators, such as, for example, valves or pumps, via which the flow of a liquid in a section of pipeline, respectively the fill level in a container, can be changed. Sensors and actuators are generally referred to as field devices. Referred to as field devices in connection with the invention are, however, all devices, which are applied near to the process and which deliver or process process relevant information. Field devices are usually composed of a plurality of components, whose structure and construction is embodied as simply as possible, in order to keep the manufacturing effort small.

In the following, for an example of a component, which can be manufactured via the method of the invention, reference is made to the disclosure of German patent application DE 10 2014 101 410, filed on Feb. 5, 2014 and published on Aug. 6, 2015. Described in this patent application is a porous, dielectric, process isolation for a radar based, microwave, fill-level measuring device. In principle, the process isolation of a field device has the goal of preventing penetration of medium from the process into the interior of the field device.

Process isolations of ceramic are utilized in automation technology, preferably when high temperatures and high pressures reign in the process. However, a ceramic, especially aluminum oxide, has the disadvantage that, due to the high dielectric constant of about 10, a low transparency for microwaves is present. In DE 10 2014 101 410, this dilemma is solved in the following way: Used as foundation for the process isolation is a suitable temperature- and pressure resistant material, e.g. a ceramic or a synthetic material or a fiber reinforced, composite material. In order to achieve the as low as possible dielectric constant suitable for use in radar-based, microwave, fill-level measuring devices and simultaneously a sufficiently large dimensioning, the material is at least partially porously embodied. In this way, a sufficiently high microwave transparency and a sufficiently high filter effect of the process isolation are assured. A rule of thumb for sufficient transparency for microwaves is as follows: The higher the dielectric constant of the material of the process isolation, the higher must the porosity of the material be.

By the embodiment of the invention, the dimensioning of the process isolation can be selected sufficiently large that the accretion- and/or condensate problem plays only a lesser, respectively no, role.

Via the porosity of the material of the process isolation, the properties of the dielectric material are optimized in such a manner that, on the one hand, the process isolation effectively and durably prevents that bits of the medium get from the process into the electronics part, respectively into the coupling unit, of the fill-level measuring device and that, on the other hand, the process isolation is largely transparent for microwave, measurement signals. A process isolation is transparent for microwaves, when the intensity of the microwave, measurement signals is weakened only insignificantly upon passing through the process isolation. Especially, the concept of sufficient transparency means that the dielectric constant of the material, respectively materials, of the process isolation lies preferably between 1 and 5.

In order to manufacture the process isolation, the basic material is foamed by addition of air, such that it achieves a predetermined porosity. Then, the component is tested for the required functionality. In the principle, a suitable porosity is ascertained via a trial and error process, which, in given cases, can be very time consuming. Added to this is the fact that known methods for the introduction of air into a material do not assure a uniform porosity within the component. Rather, the porosity within the component and naturally also between individual, serially manufactured components is subject to statistical fluctuations.

An object of the invention is to provide a method, via which a component of a field device can be reproducibly manufactured.

The object is achieved by a method having the steps of: specifying at least one structure related and/or material related, boundary condition of the component and/or a boundary condition relevant for the functionality of the component and/or at least one external boundary condition, which takes into consideration the influence of environmental conditions on the component at the location of use; optimizing the structure of the component via a finite element model taking into consideration the at least one structure related and/or material related boundary condition and/or the at least one boundary condition relevant for the functionality of the component and/or the at least one environmental condition, wherein the optimized structure of the component is described by digital data; transferring the digital data, which describe the optimized structure of the component, to a 3-D printer; and printing the component in accordance with the digital data.

Which 3-D printing method is applied depends essentially on the material to be printed. If applied as material is at least one metal, a ceramic or at least one synthetic, e.g. plastic, material, then used as 3-D printing method is a selective laser melting, respectively a selective laser sintering. If a plastic material is applied, then it is, moreover, possible to use as 3-D printing method for the at least one plastic material a fused deposition modeling method or a multi-jet modeling method. Furthermore, is noted that in connection with the invention the terms 3D printing and generative manufacturing are synonymous.

The process isolation described in DE 10 2014 101 410 is one of the components, which can be produced via the method of the invention reproducibly and optimally for the conditions at the location of use of the field device. Environmental conditions at the location of use include here especially temperature and pressure. For satisfying material related boundary conditions, it is necessary at least in the process contacting region to select a material, which withstands the temperatures at the location of use. Structure related boundary conditions are defined by the dimensions of the fill-level measuring device. The functionality of the component is determined by its two simultaneously to be fulfilled tasks: reliable isolation from the process and good transparency for microwaves.

A further example of a component with a predetermined porosity is the diaphragm of a measuring electrode, e.g. a pH electrode.

Advantageous in the case of the solution of the invention is that a correspondingly manufactured component can have location dependently different physical properties, be these of mechanical, chemical, optical or electrical nature. Moreover, the ability is present to manufacture customer- and/or application-specific components.

In an advantageous embodiment of the method of the invention, the resolution of the optimized structure of the component is matched to the resolution of the 3-D printer. Via a high resolution, for example, a very smooth surface layer can be printed, without a subsequent polishing of the surface being necessary. A correspondingly smooth surface is of great advantage in the case of hygienic applications. Furthermore, germ killing biocidal materials can be applied on the surface or in the surface layer, respectively worked into the surface or into the surface layer.

Moreover, it is provided in connection with the invention that as a structure related boundary condition an optimized material consumption is predetermined and that the optimized structure of the component is printed via hollow spaces and/or via an irregular material distribution. While in the above mentioned concrete case of the process isolation, a suitable transparency for microwaves is created via the air inclusions, now the main feature is minimizing the material while maintaining a sufficient stability of the component. Moreover, correspondingly manufactured components have the advantage that they have because of the porosity a clearly smaller weight. In this connection, especially flanges for securement of field devices on tanks or in pipelines are mentioned.

Furthermore, targeted air inclusions can also suitably influence the thermal conductivity or the electrical conductivity of a material.

A further advantage of this solution is that, in the case of manufacturing a hollow structured component, whose structure is matched to predetermined boundary conditions and environmental influences at the location of use of the associated field device, e.g. a minimal possible weight coupled with required stability can be achieved. The component is simple to handle and transport costs can be reduced. Moreover, the component can—as already indicated—be manufactured customer specifically and/or application specifically.

In an embodiment of the solution of the invention, the component has thus a porosity matched to the boundary- and environmental conditions at the location of use of the field device. Porosity defines the ratio of cavity volume (usually air inclusions) to the total volume of the porous material or material mixture. If the hollow spaces are connected with one another and with the environment, then one speaks of open porosity of the material, respectively of open pored material. If the hollow spaces are connected neither among one another nor with the environment, then one speaks of closed porosity of the material, respectively of closed pored material. If the porosity amounts to, for example, 50%, then air inclusions and material in the porous component have, in each case, the same volume fraction, wherein in the case of the known solutions of the state of the art the air inclusions are statistically homogeneous and not such as in the case of the invention deterministically distributed in the material. Therewith it is in the case of the solution of the invention for the first time possible to manufacture any porous component of a field device highly accurately reproducibly. Also, in the case of the known solutions, a component has over its total space content the same porosity, such that one speaks also of a homogeneous porosity. However, this homogeneous porosity is to be viewed only statistically. The implementing of a reproducible homogeneous porosity or a different porosity in different regions of a component is not possible with the known methods. Also, the shape of the porous components manufactured via known methods is tool constrained. Complexy structured components are only difficulty implemented. Added to this is the fact that not every material can be foamed via the known methods.

In an alternative or supplemental embodiment of the method of the invention, it is provided that a simulated material distribution of the component is printed by applying different materials with suitably different physical properties. In given cases, the materials have also a suitable porosity.

An advantageous embodiment provides that the surface of the component is printed at least partially with a protective layer or with a functional coating. Also here again, preferably, 3-D printing methods are used. Especially, the functional surface coating coming in contact with a process medium is so structured via a finite element model that it is matched optimally to the desired functionality of the component. Of course, also a single ply or multi-ply protective layer can be first simulated and then printed.

As already above described, the porosity of a component can be embodied as much as desired deterministically via the method of the invention. Thus, the porosity of the component can be open pored, closed pored or open pored and closed pored. In the case of a component with an at least partially open pored structure, a surface region exposed to the process is preferably provided with a nonporous, protective layer.

In case the functional surface or the protective layer has a complex structure, then also it is modeled by means of a finite element method and printed via the method of the invention.

Especially, the method of the invention aims to manufacture functional surface layers, which are scarcely manufacturable with conventional manufacturing methods. Thus, the texturing of a surface with a predetermined structure—e.g. analogously to the bionic structure of the sharkskin with its excellent flow properties or the surface of leaves of the lotus blossom with its dirt- and water repelling properties—is only possible on well accessible locations. Known from German laid open application, DE 10 2007 045 473 A1 is a measuring tube, whose inner surface coming in contact with the medium has a sharkskin structure.

If the surface is located—such as in the above mentioned case—in the measuring tube of a field device, then the subsequent texturing of the inner surface is very complex. If the measuring tube is also to be bent, there is the danger that the texturing will be destroyed, at least in portions. Added to this is the fact that not every material can be textured. By means of the method of the invention, it is directly possible to print according to model digital data a functional surface earlier optimized via a finite element model. In such case, it plays no role whether the surface is accessible for a working tool or not: Complex structures can also be printed in regions, in the case of which a subsequent processing is completely impossible.

In the case of magneto-inductive flow measuring devices, the medium flowing in the interior of the measuring tube should have a defined flow profile. Depending on application, the suitable flow profile can be laminar or turbulent.

With a correspondingly modeled surface structure on the inner surface of the measuring tube, any suitable flow profile within a measuring tube can be implemented. It is, moreover, quite possible also to embody the surface structure application specifically.

BRIEF DESCRIPTION OF THE DRAWING

FIG. 1 shows a flow diagram, which illustrates schematically an embodiment of the method of the invention.

The following are examples of components, which can be manufactured according to the method of the invention. This list is, in no case, intended to be exclusive. Thus, included are:
- a measuring tube of a flow measuring device, through which a fluid flows;
- a beam former, which is arranged in the beam path of a radar fill-level measuring device;
- connecting component, e.g. a neck tube, of a field device;
- a membrane or a diaphragm with electrode, as applied in a field device, especially a pressure sensor or an ion sensitive sensor;
- a housing;
- a process isolation;
- an adapting layer or a reflection layer in the beam path of an ultrasonic sensor.

DETAILED DISCUSSION IN CONJUNCTION WITH THE DRAWING

The method of the invention will now be explained in greater detail based on FIG. 1, the sole FIGURE of the drawing.

After the start of the program at point 10, information necessary for the finite element modeling is specified at point 20. In the illustrated case, this includes the environmental parameters, temperature and pressure, to which the component is exposed at the location of use of the field device. In such case, it is noted that the costs for the materials are higher, the higher the requirements for temperature- and pressure resistance. In many cases, it is important, moreover, to specify, at least roughly, the dimensions of the component. Also important for the simulation of the component is then, naturally, the function, which the component is to fulfill.

Based on the predetermined information, at the program points 30, 40, an optimized structure of the component is calculated via a finite element model. The optimized structure of the component is described by digital data. These are transferred at program point 50 to a 3-D printer, which prints the component at program point 60 in accordance with the digital data.

The invention claimed is:

1. A method for manufacture of at least one component of a field device for determining or monitoring a process variable, wherein the field device is applied in automation technology and is manufactured from at least one material, the method comprises the steps of:
   specifying at least one structure related and/or material related, boundary condition of the component and/or a boundary condition relevant for the functionality of the component and/or at least one external boundary condition, which takes into consideration the influence of environmental conditions on the component at the location of use; and
   optimizing the structure of the component via a finite element model taking into consideration said at least one structure related and/or material related boundary condition and/or said at least one boundary condition relevant for the functionality of the component and/or said at least one environmental condition, wherein:
   the optimized structure of the component is described by digital data; transferring the digital data, which describe the optimized structure of the component, to a 3-D printer; and printing the component in accordance with the digital data.

2. The method as claimed in claim 1, wherein:
the resolution of the optimized structure of the component is matched to the resolution of the 3-D printer.

3. The method as claimed in claim 1, wherein:
as a structure related boundary condition an optimized material consumption is predetermined; and
the optimized structure of the component is printed via hollow spaces and/or via an irregular material distribution.

4. The method as claimed in claim 1, wherein:
the differences in the material distribution of the component are modeled and printed via a correspondingly matched porosity of the at least one material.

5. The method as claimed in claim 1, wherein:
the differences in the material distribution of the component are printed by applying different materials with suitably different physical properties.

6. The method as claimed in claim 1, wherein:
the surface of the component is printed at least partially with a protective layer or with a functional coating.

7. The method as claimed in claim 6, wherein:
a functional surface coating coming in contact with a process medium is so structured via a finite element model that it is optimally matched to the desired functionality of the component.

8. The method as claimed in claim 6, wherein:
the functional surface coating is applied on the surface of the component in a 3-D printing method.

9. The method as claimed in claim 6, wherein:
said component is printed with an open pored porosity, a closed pored porosity or an open pored and closed pored porosity.

10. The method as claimed in claim 9, wherein:
a component with an at least partially open pored structure is provided in a surface region with a protective layer.

11. The method as claimed in claim 9, wherein:
said functional surface or said protective layer has a complex structure, which is simulated via the finite element method (FEM).

12. The method as claimed in claim 9, wherein:
the component is produced for one of:
a measuring tube of a flow measuring device, through which a fluid flows;
a beam former, which is arranged in the beam path of a radar fill-level measuring device;
a connecting component of a field device, wherein the component is a membrane or a diaphragm, which is applied in the case of a field device;
a housing; and
an adapting layer or a reflection layer in the beam path of an ultrasonic sensor.

13. The method as claimed in claim 12, wherein:
the field device is a pressure sensor or an ion sensitive sensor.

* * * * *